S. ATHA.

Improvement in Wheels for Vehicles.

No. 4,938. Reissued June 11, 1872.

Witnesses:

J. M. Wagner.

L. K. Phillips.

Inventor:

Simeon Atha

By Johnson & Klaucke Atty's his Attorneys

AM. PHOTO-LITHOGRAPHIC CO. N. Y. (OSBORNE'S PROCESS.)

UNITED STATES PATENT OFFICE.

SIMEON ATHA, OF WEST LIBERTY, OHIO.

IMPROVEMENT IN WHEELS FOR VEHICLES.

Specification forming part of Letters Patent No. 96,656, dated November 9, 1869; reissue No. 4,938, dated June 11, 1872.

*To all whom it may concern:*

Be it known that I, SIMEON ATHA, of West Liberty, in the county of Logan, and State of Ohio, have invented a new and useful Improvement in Carriage or Wagon Wheels, of which the following is a specification:

Hitherto the spokes of carriage and wagon wheels have been secured to their hubs by means of metallic sockets and flanged plates of various construction. Hub-pipes having flanges, between which and a screw-flanged cap the spokes have been clamped, have also been used; but in each case, as far as I am informed and believe, the spokes have been inserted and secured in place one at a time and independently of each other in constructing the wheel. This method has, in every instance, not only had the effect to weaken the spokes at their junction with the hub, but also to weaken the hub itself. The object of my invention is to overcome this difficulty and objection; and the invention which forms the subject-matter of this patent consists in forming the spokes into a strong, solid, compact body, constituting a single central frame by gluing or otherwise securing their contiguous beveled ends together and forcing them in position solidly, compactly, and uniformly by force applied to their outer ends, and thus by a union of all the spokes form the body of a wooden wheel, so that neither of the spokes thereof will be separate, or can be removed from said central body, and then attaching to the body of the wheel so formed and completed the axle-boxes and parts constituting the hub, and in this way reversing the hitherto mode of constructing wooden wheels, and producing a wooden wheel of comparatively greater strength, greater durability, and of cheaper construction, all other things being equal. My said invention consists further in combining with a wooden wheel in which the spokes are united together in one strong and solid frame or body, as described, a hub composed of two separate sections, and of uniting these separate and distinct parts by means of cylindrical flanged boxes secured not only to the solid spoke body of the wheel but also to the sections of the hub, so that really the hub is secured to the spokes instead of the latter to the hub, as heretofore. This serves the important advantage of rendering the spokes the main support for the hub, and enables me to secure two separate and independent hub ends to a single solid spoke-frame, in which each spoke shall be a fixed part of the other.

Figure 1:
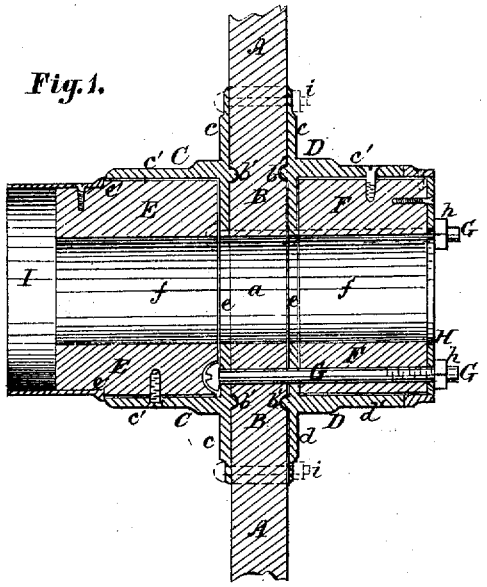
Figure 2:
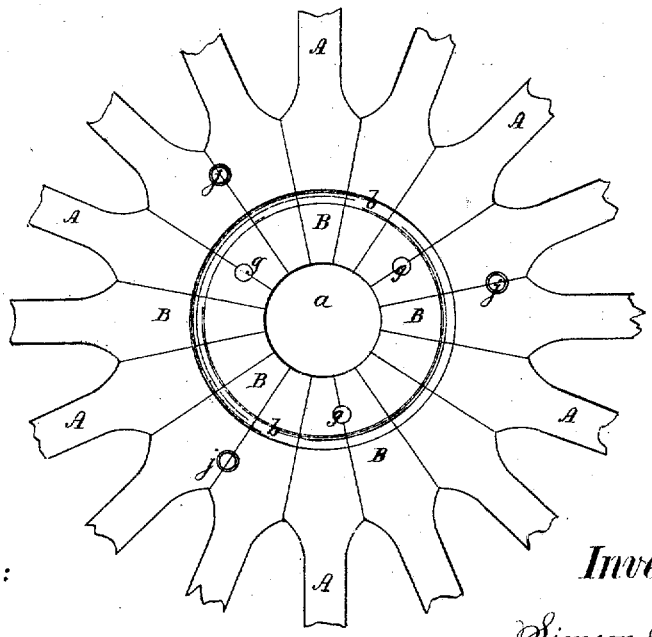

In the accompanying drawing, Figure 1 represents a sectional view, showing the construction of the hub and wheel; and Fig. 2 represents a view showing the spokes of the wheel formed into a solid body, and constituting a single central frame for the attachment thereto of the hub.

In the formation of my improved wheel the contiguous beveled ends B of the spokes A are first glued and then firmly forced together by placing a form of any suitable kind around the outer ends of the spokes, and tightening the same by screws, or by any other suitable means, in such a manner that the spokes are firmly united to each other at their bases, and thus form the body of the wheel in one piece, before the parts constituting the hub are attached. In the center of this body of the wheel formed by the united spokes, a circular space, *a*, is formed, through which the axle passes. Each one of the spokes is provided on the two faces of its lower beveled end B with a curved groove, which grooves, when the spokes are united to form the body of the wheel, form a continuous circular groove, *b*, by means of which the spokes are securely held and prevented from moving, as hereinafter more fully described. The hub is formed of two separate circular metal boxes, C and D, which may be cast or otherwise formed, and which consist each of two circular flanges, *c c'* and *d d'*, at right angles to each other, the flanges *c'* and *d'* extending inwardly beyond the flanges *c* and *d*, to form circular rims *b'*, which fit into the circular grooves *b* on the faces of the beveled portions B of the spokes. The flanges *c d* of these separate boxes may extend inwardly beyond the flanges *c' d'* sufficiently to form central openings or spaces *e* corresponding to the opening *a* in the center of the body of the wheel formed of the united spokes, and to the openings *f* of the wooden boxes E F, thus forming a continuous central opening through the hub and wheel for the axle. The wooden boxes E F are driven into their shells C D, respectively, from the outer ends, until their inner faces bear against the inward extensions of the flanges *c d*, or, in cases of very light wheels, where these inner extensions are superfluous, against the body of the wheel formed of the united spokes, and they may be secured additionally by screws passing into them through the flanges *c′ d′*. The box E, on the outer end of the hub, is provided with a shoulder, *e′*, on which the cap or band I may rest, which cap is secured to the wooden box E by a screw.

In the example shown the metal boxes C D are secured to each other and held against the spokes by means of bolts G passing through the inner extensions of the flanges *c d* through holes *g* in the united spokes, through wooden box F, and a metal washer, H, on the outside of which they are secured by nuts *h*, suitable recesses being formed in the wooden box F for the heads of the bolts. These bolts hold the boxes firmly against the body of the wheel, and I prefer this means of attachment for heavy wagon-wheels requiring very great strength. But in light carriage and buggy wheels, in which lightness is a consideration, and in which as above stated, I do not use the inner extensions of the flanges *c d*, the boxes may be secured to the body of the wheel consisting of the united spokes, by means of bolts *i* passing through the flanges *c d* and holes *j* in the spokes, which bolts *i* may be used in combination with the bolts G, where the latter unite the parts, as shown in Fig. 2.

By this improved construction of wagon or carriage wheels I obtain a great advantage in the strength and firmness as well as durability of the same, for this construction prevents the spokes from working loose within the hub.

In wheels in which the spokes are separately driven into proper spaces in the hub-box their wear will loosen the spokes in the box and render them more liable to be broken; while in my wheel, the spokes being firmly united at their base, and held by the rims *b′*, they support each other and prevent each other from moving in or out. And in this respect the grooves *b* and circular rims *b′* are of especial use, for by means of them any independent movement of any of the spokes, even should one by accident break loose from the others, which is, however, almost impossible, these rims would still hold that spoke firmly in place.

By forming the hub in two separate non-contiguous boxes without connecting-pipes, I am enabled to make all the parts constituting the hub much lighter, while at the same time the entire wheel is much stronger and more durable than the ordinary ones. And should any spoke break, and it be necessary to replace it by a new one, the hub-boxes can be very readily removed, the broken spoke sawed out at the base from the body of the wheel, a new spoke glued and forced into place, and the hub boxes replaced, without the necessity of disturbing the rim or tire of the wheel.

Having described my invention I claim—

1. A carriage or wagon wheel in which all the beveled spoke-bases are formed together into a single central compact frame or body first and before the attachment of the parts that form the hub, as described.

2. The combination of a single central solid frame of spokes united first together in one strong body, as described, with a hub composed of two separate sections, united together and to the single solid spoke-frame, as described.

3. A wheel consisting of two sets of boxes, C D E F, not contiguous to each other, and secured substantially as and for the purpose described.

Witnesses: SIMEON ATHA.

R. N. JORDAN,

GEORGE W. TAYLOR.